(12) United States Patent
Vatani et al.

(10) Patent No.: US 12,246,487 B2
(45) Date of Patent: Mar. 11, 2025

(54) CARRIER PLATE AND METHOD OF USE THEREOF

(71) Applicant: Sakuu Corporation, San Jose, CA (US)

(72) Inventors: Morteza Vatani, Los Gatos, CA (US); Seyed Mohammad Sajadi, Sunnyvale, CA (US); Timothy Byman, Saint Michael, MN (US); Tom Hays, Blaine, MN (US); Peter Bruss, White Bear Lake, MN (US); Don Ambli, Forest Lake, MN (US); Justin Carroll, Vadnais Height, MN (US); Lawrence Nguyen, Santa Clara, CA (US)

(73) Assignee: Sakuu Corporation, San Jose, CA (US)

( * ) Notice: Subject to any disclaimer, the term of this patent is extended or adjusted under 35 U.S.C. 154(b) by 285 days.

(21) Appl. No.: 18/074,298

(22) Filed: Dec. 2, 2022

(65) Prior Publication Data

US 2023/0226762 A1     Jul. 20, 2023

Related U.S. Application Data (60) Provisional application No. 63/299,852, filed on Jan. 14, 2022.

(51) Int. Cl.
| | |
|---|---|
| *B29C 64/245* | (2017.01) |
| *B33Y 30/00* | (2015.01) |
| *B65G 17/12* | (2006.01) |

(52) U.S. Cl.
CPC ............ *B29C 64/245* (2017.08); *B33Y 30/00* (2014.12); *B65G 17/12* (2013.01)

(58) Field of Classification Search
None
See application file for complete search history.

(56) References Cited

U.S. PATENT DOCUMENTS

| | | |
|---|---|---|
| 5,879,489 A | 3/1999 | Burns et al. |
| 8,994,592 B2 | 3/2015 | Scott et al. |
| (Continued) | | |

FOREIGN PATENT DOCUMENTS

| | | | | |
|---|---|---|---|---|
| WO | WO-2014037826 A1 | * | 3/2014 | ........... B29C 67/007 |
| WO | WO-2017085648 A2 | * | 5/2017 | |

OTHER PUBLICATIONS

International Search Report and Written Opinion issued Jul. 21, 2023 in corresponding PCT application PCT/US2023/060764 (15 pages).

*Primary Examiner* — William R Harp
(74) *Attorney, Agent, or Firm* — Arman Khosraviani (57) ABSTRACT

Improved carrier plates and methods of use thereof are provided to secure and transport individual layers of a multilayer structure during manufacture of the multilayer structure. In one implementation a carrier plate is provided including a lower portion and a raised portion to support a flexible substrate holding an individual layer laid on an upper surface of the raised portion. Clamping mechanisms, such as rollers, are formed on extended regions adjacent to side walls of the raised portion. The clamping mechanisms are configured to move from open positions, where the clamping mechanisms are spaced apart from the sidewalls of the raised portion, to closed positions, where the clamping mechanisms secure opposite edge portions of the flexible substrate between the clamping mechanisms and the first and sidewalls of the raised portion.

17 Claims, 6 Drawing Sheets

(56) References Cited

U.S. PATENT DOCUMENTS

| | | |
|---|---|---|
| 10,710,303 B2 | 7/2020 | Broady et al. |
| 2002/0145213 A1 | 10/2002 | Liu et al. |
| 2020/0156317 A1 | 5/2020 | Van Esbroek et al. |
| 2020/0298477 A1 | 9/2020 | Rogren |
| 2021/0138730 A1 | 5/2021 | Budel |

* cited by examiner

CARRIER PLATE AND METHOD OF USE THEREOF

TECHNICAL FIELD AND BACKGROUND

The present disclosure pertains to improved carrier plates and methods of use thereof to secure and transport individual layers of a multilayer structure during manufacture of the multilayer structure.

In conventional additive manufacturing (AM), the layers are built on top of each other, or they are built on a conveyor belt, and at the last stage, they are stacked on each other. However, as described in a related Provisional Application No. 63/299,867, a platform for AM manufacturing has been developed which is a modular base machine that builds each layer separately. Each individual layer passes several stations, and each station has a unique function. Handling the layers between stations in this new platform requires carrier plates for carrying the individual layers of the multilayer product being manufactured. Thus, carrier plates are disclosed herein which are particularly adapted to the new platform described in the above-noted related application, which is hereby incorporated by reference.

SUMMARY OF THE INVENTION

A carrier plate is provided for clamping a flexible substrate including a lower portion a raised portion located on an upper surface of the lower portion and configured to support the flexible substrate being laid on an upper surface of the raised portion, wherein a first extended region of the lower portion extends on one side of the raised portion and a second extended region of the lower portion extends on an opposite side of the raised portion, a first clamping mechanism formed on an upper surface of the first extended region adjacent to a first side wall of the raised portion, and a second clamping mechanism formed on an upper surface of the second extended region adjacent to a second sidewall of the raised portion, wherein the first and second clamping mechanisms are configured to move from open positions, where the first and second clamping mechanisms are spaced apart from the first and second sidewalls of the raised portion, respectively, to closed positions, where the first and second clamping mechanisms respectively secure opposite edge portions of the flexible substrate between the first and second clamping mechanisms and the first and second sidewalls of the raised portion.

A carrier plate assembly is provided including a carrier plate having a lower portion and a raised portion in a central region of the lower portion, wherein the raised portion extends above an upper surface of the lower portion, a bottom frame configured to be located on a peripheral upper surface region of the lower portion to surround sidewalls of the raised portion and to expose an upper surface of the raised portion, the bottom frame being further configured to support peripheral edge regions of a flexible substrate laid on the upper surface of the raised portion of the carrier plate, and a top frame configured to be located on a peripheral upper surface of the bottom frame to clamp the peripheral edge portions of the flexible substrate, the top frame including an opening for exposing an upper surface of the flexible substrate.

A carrier plate assembly is provided including a carrier plate having a central opening surrounded by a peripheral region, wherein a groove is formed in the upper surface of the peripheral region to surround the central opening, the groove being spaced from edges of the central opening to form an inner upper surface peripheral region of the carrier plate between sidewalls of the central opening and inner edges, and to form an outer upper peripheral surface region surrounding outer edges of the groove, and a top frame configured to fit into the groove and to secure edges of the substrate which extend into the groove, the substrate being located over the central opening and over the inner upper surface peripheral region, between inner sidewalls of the top frame and inner sidewalls of the groove.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

This disclosure provides carrier plates, and methods for use thereof, to fix the position of individual layers during a process in which individual layers are transported on the carrier plates to multiple processing stations, and then stacked in a particular order on one another to form a multilayer product. As such, it is important to know the position of the patterns of the individual layers in each station to avoid losing the resolution, and to ensure that each layer is stacked in the correct place on the overall stack. In addition, the layers should be transferred securely and in manner in which the individual layers are distinguishable from one another. Therefore, in accordance with aspects of this disclosure, each carrier plate has a unique code that can represent the layer number of the individual layer mounted on a substrate on the carrier plate.

In addition, or alternatively, to being used to indicate a layer number of an individual layer, the unique code can also be used to indicate other information about the layer on the carrier plate. This can include, for example, processes that have been, or need to be, performed regarding the layer on the carrier plate, material used for the layer, information pertaining to the next step to be performed (e.g., which station to go to next), and the build platform or part it is intended to form part of. Also, the carrier plate facilitates detaching the substrate (e.g., a flexible mylar sheet) from a layer deposited thereon in the last step of the process so that the layer can be stacked on other layers of the multilayer product. It is noted that the carrier plates disclosed herein are particularly useful, for example in a 3D printing apparatus or other AM apparatuses.

This disclosure provides carrier plates and methods for handling layers individually between processing stations. The purpose of these carrier plates and methods is to fix and secure the position of each layer in the x, y and/or z direction, and in pitch, roll and/or yaw, to define the position of the patterned layers in each station using the various kinematic mounts such as slots, or pin locators on the carrier plates, to transfer the layers on flexible substrates between the stations, to facilitate the peel-off process of the layers from their respective substrates at the stacking station, and to define the individual layers, by for example process(es) carried out within a layer, steps performed, time-related aspects, material(s) used, layer number, data pertaining the next procedure the layer has to undergo (e.g., which module the carrier plate should be operated on next) etc. to keep track of them and to ensure accurate construction of the ultimate multilayer product at the stacking station.

Figure 1A:
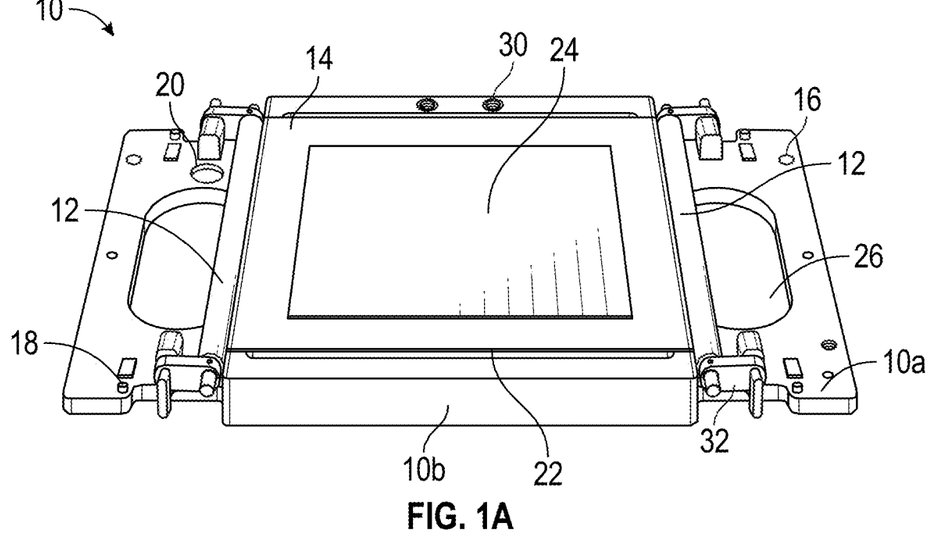
FIGS. 1a and 1b show a perspective view and a bottom view, respectively, of a carrier plate, in accordance with aspects of the present disclosure.
Figure 1B:
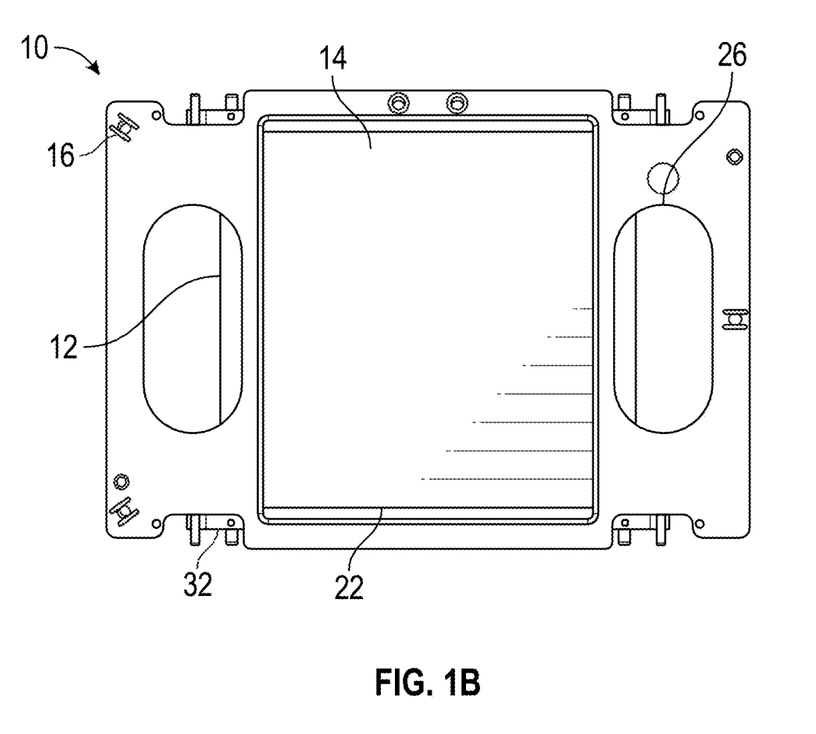

Referring to FIGS. 1a and 1b, a first implementation of a carrier plate 10 is shown with the carrier plate parts, clamping mechanisms illustrated in the form of clamping members 12 for holding the flexible substrate 14 in a fixed position on the carrier plate 10, locator pins 16 to dictate the position of the carrier plate 10 in each station, magnets 18 to hold the clamping members 12 back when they are open, and an identification device 20, such as an RFID, to provide a record of the information regarding each carrier plate 10 to correlate with the identity of the particular layer deposited on the flexible substrate 14 being held by the individual carrier plate 10. The identification device 20 is configured to allow information to be read and/or written to it, and/or updated during or between various stages of processing, transport and/or use. In the event that a quality control check finds a layer processed at a station to be outside of the acceptable parameters, such update may comprise assigning the layer to another part, identifying it for disposal, or recycling the material from the layer. The identification device 20 may also communicate with one or more other computer processors which control one or more aspects of the build process.

Specifically, FIG. 1a shows a perspective view of a carrier plate 10, with a lower portion 10a and a raised portion 10b extending upward from the lower portion 10a. As also shown in FIG. 1a, the raised portion 10b is configured to support a substrate 14 (e.g., a Mylar flexible substrate, although other materials could be used) on upper surfaces of the raised portion 10b. In the implementation shown in FIGS. 1a and 1b, an opening 22 can extend through the lower portion 10a and the raised portion 10b, such that the lower surface of the substrate 14 laid across the upper surfaces of the raised portion 10b lays across the opening 22. As shown in FIG. 1b, this means the lower surface of the substrate 14 is exposed through the opening 22. However, it is noted that the carrier plate 10 could be constructed without the opening 22, if preferred.

In one implementation, the opening 22 is sized to ensure that any patterned powder layers on the upper surface is within the opening 22. In regard to this implementation, the opening 22 can be sized to ensure that the patterned portion of deposited powder layer 24 is displaced away from edges of the substrate 14 to allow easier access to the patterned portion of the layer 24. Carrier plates can be selected based on the size of opening 22 required to create the patterned layer 24 desired. The opening 22 enables an energy source, for example a laser or a UV source 25 to be directed through the opening 22 and be directed at a layer deposited on the flexible substrate 14.

The carrier plate 10 illustrated also comprises various grasping areas, such as handles 26 which enable a user to grasp the carrier plate 10 and move it from one location to another, and/or areas on the periphery on the carrier plate 10 (including the handle 26, for example) to facilitate a robot (not shown) being able to pick the carrier plate 10 up and place it where required. In one implementation, an area on the periphery of the carrier plate 10 may be configured to operatively connect using a combination of alignment pins (e.g., locator pins 16 and jaws of a robotic end effector, to enable the robotic end effector to securely grasp the carrier plate 10. The grasp may be secure enough for the robotic end effector to rotate the carrier plate 10 with a substrate attached. In one embodiment the area may be a robot pickup area 30 located on both sides of the carrier plate 10 such that the carrier plate can be picked up by the robotic end effector from either and/or both sides.

The carrier plate 10 illustrated also comprises one or more locators, such as alignment, or locator, pins or alignment holes. The locators 16 may vary in size and location, such that the carrier plate 10 may only be positioned in one specific orientation it moves between various processing stations. In addition, the locators 16 may be disposed on one side of the carrier plate 10, making it impossible for the carrier plate to be positioned upside down on at any processing station, or at least minimizing chances of such an error. In some embodiments, the locators 16 (alignment or locator pins) are sized to provide clearance between the pins and the holes or openings in which they fit, and the number and position selected to facilitate self-alignment. This allows the carrier plate 10 to "float", providing for six degrees of freedom, enabling self-location to kinematic coupling as the carrier plate is positioned for the stacking process. Alternatively, or additionally, several pairs of dowel pins 16 may be provided on the carrier frame 10 to create a Maxwell coupling when engaged with ball locators, constraining to six degrees of freedom.

Figure 2A:
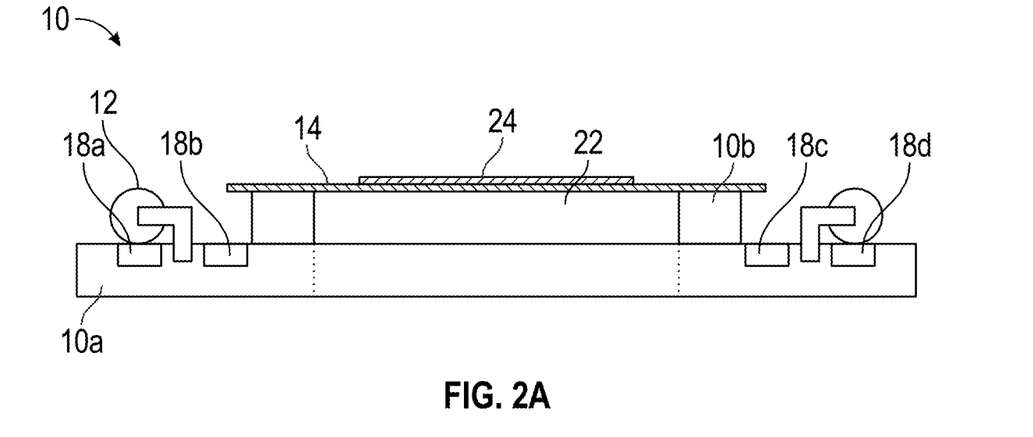
FIGS. 2a and 2b show the operation of clamping members in the carrier plate of FIG. 1a in an open position and a closed position, respectively, in accordance with aspects of the present disclosure.
Figure 2B:
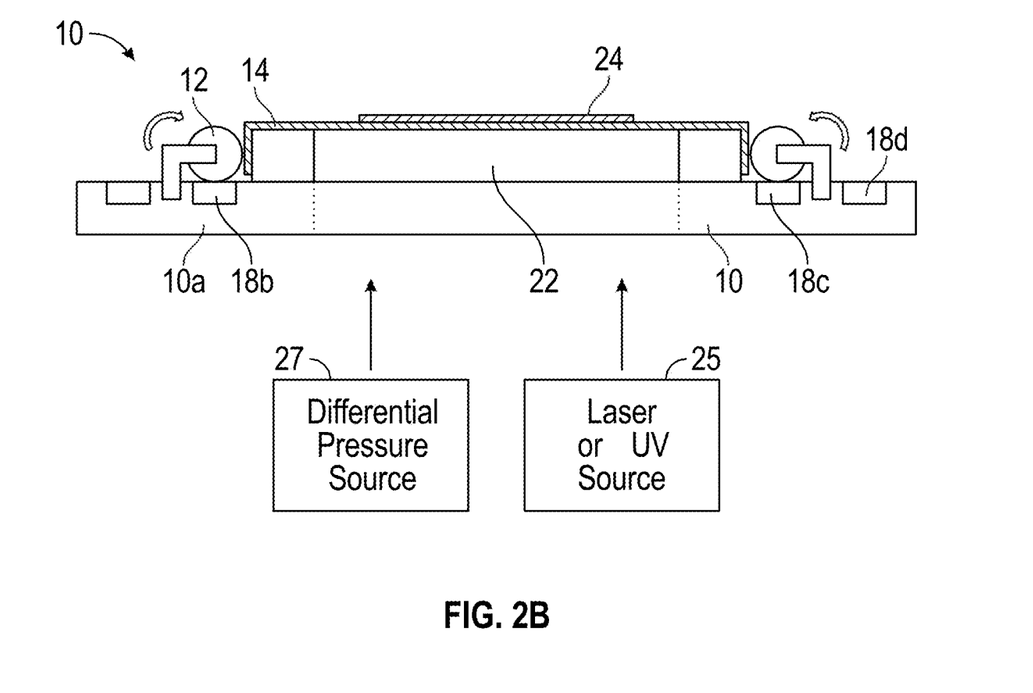

FIGS. 2a and 2b show a mechanism of FIGS. 1a and 1b being used to hold a flexible substrate 14 through the clamping members 12 located on opposite sides of the raised portion 10b of the carrier plate 10. The clamping members 12 may comprise elongated bars (or roller bars) which extend a length of a periphery of the carrier plate 10, for example a cylindrical rod. The clamping members 12 can be closed and opened automatically via the rotation of an actuator 32 connected to the clamping members 12 and mounted on the lower portion 10a of the carrier plate. Though the figures illustrate two clamping members 12, it will be apparent to those of skill in the art that the carrier plate 10 may be configured with only one clamping member 10, or with one "clamp" being fixed in location, and the other movable.

FIG. 2a shows the actuators 32 in an open position, holding the corresponding clamping members 12 away from edges of the flexible substrate 14. FIG. 2b shows the actuators 32 in a closed position, so that the clamping members 12 can secure the edges of the flexible substrate 14 against sidewalls of the raised portion of the carrier plate 10. Once the actuators 32 are open, magnets 18a and 18d on the carrier plate 10 hold them open, thereby holding the corresponding clamps 12 away from edges of the substrate 14, to avoid extra movement of the actuators 32 and clamping members 12 when they are not intended to secure the edges of the substrate 14. Additionally, magnets 18b and 18c on the carrier plate 10 may also aid in keeping the clamping members 12 in place when they are intended to secure the edges of the substrate 14. In one embodiment, the clamping members 12 may be textured, providing a roughened surface, increasing friction between the clamping members 12 and the flexible substrate 14. In another embodiment, the clamping members 12 may comprise protruding elements, fins, or a threaded configuration to firmly grip the substrate. In a further embodiment, the sidewalls of the raised portion 10b of the carrier plate 10 may comprise a smooth or slippery surface, enabling the clamping members 12 to traverse the surface easily.

Prior to securely attaching a flexible substrate 14 to the carrier plate 10, in one implementation, a pressure differential may be applied through the carrier plate by a differential pressure source 27 to influence the substrate 14 to lie flat across the raised portion 10b of the carrier plate and to be tensioned. The actuator 32 may then be rotated enabling the clamping member 12 to move towards the sidewalls of the raised portion 10b of the carrier plate 10. It is desirable that the entire length of the clamping member 12 engage with the substrate 14, with the sizing of the clamping member 12 configured to ensure maximum engagement along the length of the clamping member 12 and the substrate 14. Alternately, the clamping member 12 may be configured to be replaceable or adjustable, allowing for clamping members of different sizes to be utilized depending upon the dimensions (thickness) of the substrate 14 to be used.

As the clamping members 12 contact the substrate 14 and move towards the lower portion 10a of the carrier plate, friction between the substrate 14 and the clamping members 12 allows for effectively pulling the edges of the substrate in a downwards direction, along the sidewalls of the raised portion 10b of the carrier 10 and thus facilitating the substrate to be further tensioned. In one implementation, it is desirable when securely attaching the flexible substrate 14 to the carrier plate 10, that both clamping members 12 be moved towards the sidewalls of the raised portion 10b of the carrier plate 10, or at least engage with the flexible substrate 14 substantially simultaneously, thereby optimizing the tension resulting across the substrate as both clamping members secure the edges of the substrate to the sidewalls of the raised portion of the carrier plate.

In another implementation one clamping member 12 may secure one side of the substrate 14 prior to the other clamping member 12 securing the other side of the substrate 14. Properly tensioning the substrate 14 in either case providing for optimization of contact between the printed layers 24 as they are being stacked. In another implementation, the clamping member comprises a roller, which rotates in one direction only, to increase the tension as the clamping member 12 contacts the substrate on the sidewalls of the raised portion 10b. The roller may be further rotated to increase the tension if desired.

In one configuration, with the actuators 32 in the closed configuration (refer to FIG. 2b) a central axis of the clamping member 12 is lower than a central axis of the clamping member 12 in its open configuration (refer to FIG. 2a), such that when the clamping member is engaged with the substrate 14, it remains engaged until the actuator 32 is moved to the open configuration. This may be achieved by configuring a point of contact of the clamping member 12 with the lower portion 10a of the carrier plate 10, or the magnet 18a disposed thereon, in the open position to be higher than a point of contact of the clamping member 12 with the lower portion 10a of the carrier plate, or the magnet 18b disposed thereon, in the closed position. The actuators 32 may comprise a grasping feature associated with the clamping members 12 which can be utilized to enable the clamping members to be rotated either manually or in an autonomous manner.

Figure 3A:
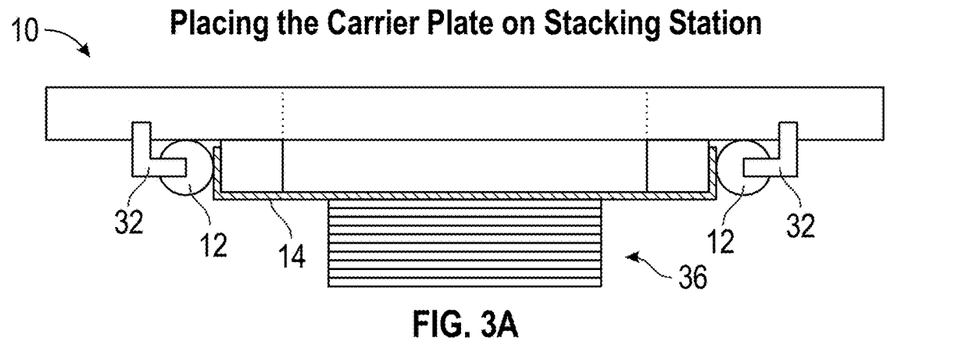
FIGS. 3a-3c show a method of detaching the substrate from a layer carried by the substrate so that the layer can be deposited on a stack of layers forming a multilayer device, in accordance with aspects of the present disclosure.
Figure 3B:
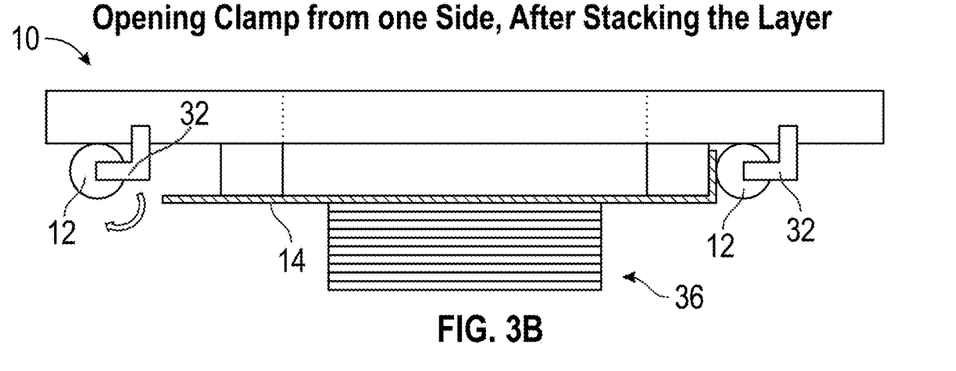
Figure 3C:
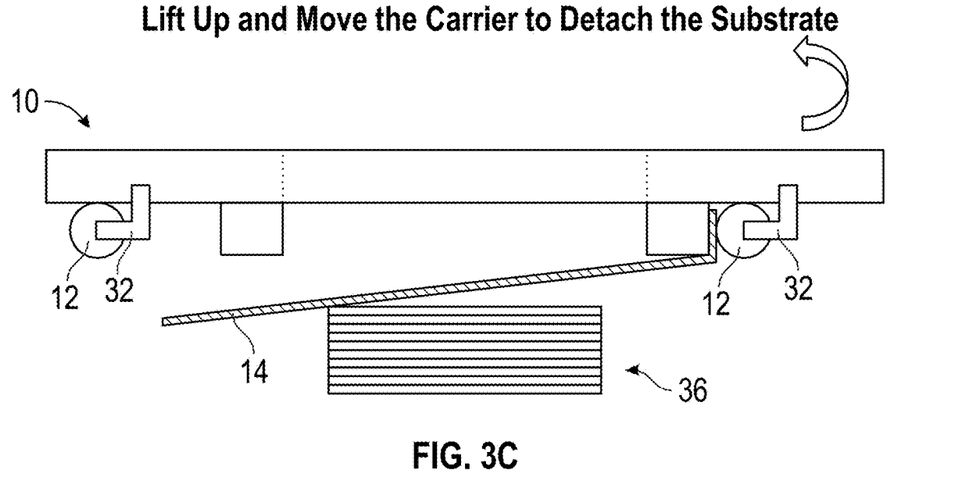

FIGS. 3a-3c show a method to detach the flexible substrate 14 from the layer deposited thereon after transferring the layer through one or more various processing stations to a layer stack 36 of a stacking station. To separate the substrate 14 from the layer, one of the actuators 32 is opened (FIG. 3b). In one embodiment, the actuator 32 comprising a grasping feature associated with the clamping member 12 can be rotated to facilitate this action, the grasping feature configured for manual use and/or automation. The carrier 10 is then lifted up and rotated to detach the layer from the substrate (refer to arrow in FIG. 3c), or in an alternative configuration, the stack 36 can be lowered to influence the layer to separate from the substrate. The carrier plate 10 along with the substrate 14 (e.g., Mylar) can then be removed, by an individual or a robotic mechanism, away from the stacked layers 36. The process is then repeated with a subsequent carrier plate 10. As described, it will be apparent that it is possible for a carrier plate 10 to be operated with the actuator 32 on one side of the carrier plate 10 always being opened to enable release of the substrate 14. In another implementation, actuators 32 are opened on one side for a first carrier plate and an alternate side for a subsequent carrier plate. This enables the opening to be alternated from one side to the other sequentially as peeling occurs for consecutive layers, which provides for a lowering of errors and stresses within the process. This is particularly beneficial when two or more layers are required, for example, 10, 20 or more.

Other types of carrier plates can be used to secure the layer's position and define the layer's location in each station, such as using magnetic frames shown in the implementations of FIGS. 4-7 discussed below.

Figure 4A:
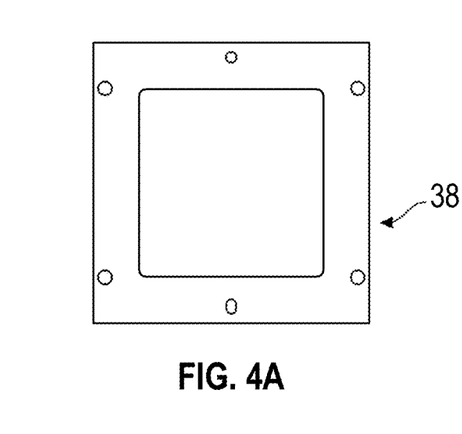
FIGS. 4a-4c show a top view, a bottom view and a perspective view, respectively, of a bottom frame of an alternative implementation of a carrier plate assembly, in accordance with aspects of the present disclosure.
Figure 4B:
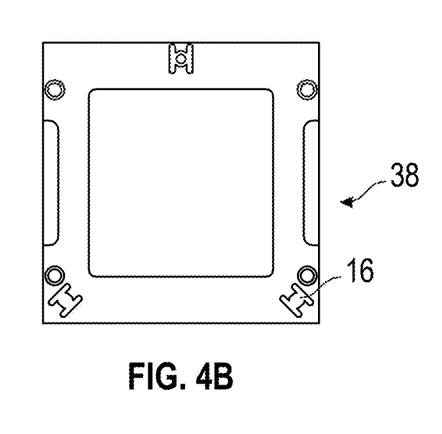
Figure 4C:
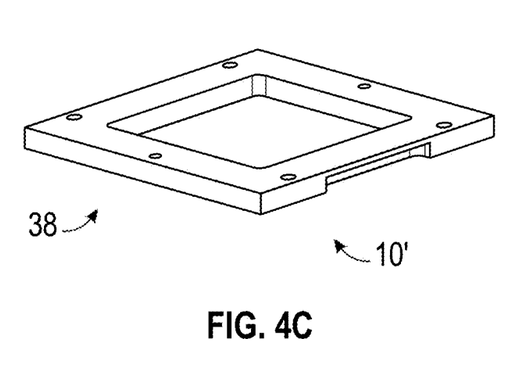
Figure 5A:
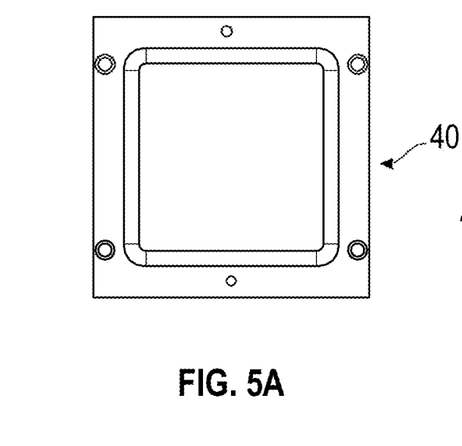
FIGS. 5a-5c show a top view, a bottom view and a perspective view, respectively, of a top frame of the alternative implementation of the carrier plate assembly, in accordance with aspects of the present disclosure.
Figure 5B:
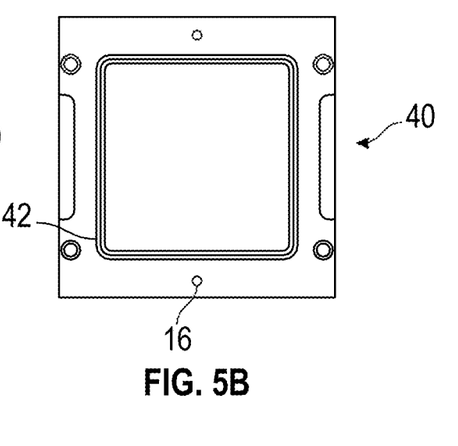
Figure 5C:
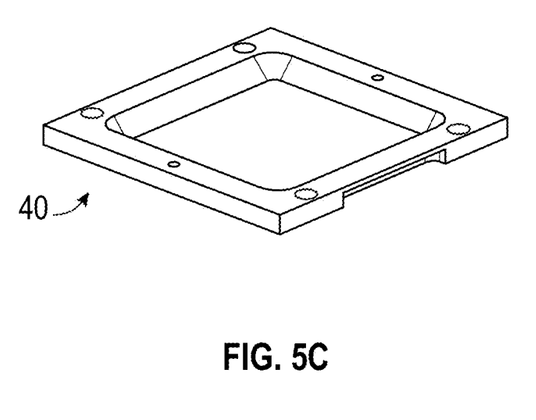

FIGS. 4-6 show carrier plate parts and a method for loading and securing a flexible substrate 14 using magnetic frames to secure peripheral edges of a substrate on which a layer has been deposited, rather than using the clamping arrangement discussed above regarding FIGS. 1-3. FIGS. 4a-4c show the bottom plate/frame 38, and FIGS. 5a-5c show the top plate/frame 40 of a carrier frame assembly 10' described in detail in FIGS. 6a-6d. As shown in FIG. 5b, a lower surface of the top frame 40, an O-ring 42 is used to seal the area and avoid vibration of the fixed substrate 14 when air is used at a processing station to remove extra powder. As shown in FIG. 5c, a slope of an inner edge on the top frame 40 will help to remove powder from the frame that has been loosened through the use of air. The top and bottom frames 38 and 40 and the carrier plate 10' can be held to each other through magnetic force, although other clamping techniques could be used. A pin locator 16 on the bottom frame defines the position of the frame in each station (e.g., see FIG. 4b).

Figure 6A:
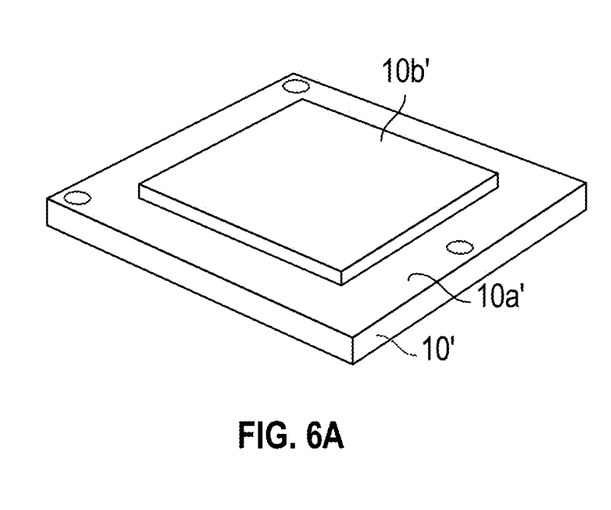
FIGS. 6a-6d show perspective views of steps for assembling the alternative carrier plate assembly to secure a substrate (flexible or inflexible) with a layer formed thereon, using the bottom and top frames of FIGS. 4a-4c and 5a-5c, respectively, in accordance with aspects of the present disclosure.
Figure 6B:
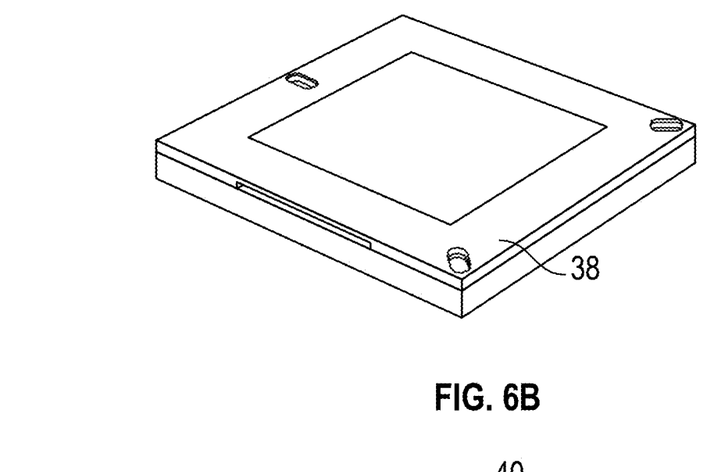
Figure 6C:
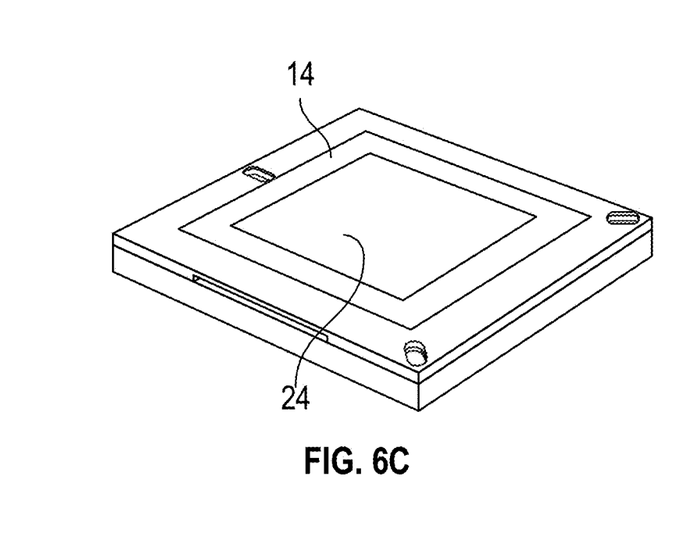

FIGS. 6a-6d shows how the carrier plate 10' and the top and bottom frames 38 and 40 shown in FIGS. 4a-4c and 5a-5c are stacked on one another (e.g., magnetically drawn together) to form a carrier plate assembly. To begin, the carrier plate 10' shown in FIG. 6a has a lower portion 10a' and a raised portion 10b' in a center area of the lower portion 10a'. The bottom frame 38 of FIGS. 4a-4c is placed on top of the carrier plate 10' in FIG. 6b to cover sidewalls of the raised portion 10b' and to allow an upper surface of the raised portion 10b' to be exposed. In FIG. 6c, a substrate 14 is laid on top of the exposed upper surface of the raised portion 10b', and peripheral edges of the substrate 14 extend over the upper surface of the bottom frame 38 surrounding the upper surface of the raised portion 10b' of the carrier plate 10'. FIG. 6c also shows the deposited powder layer 24 in the central area of the supporting substrate 14.

Figure 6D:
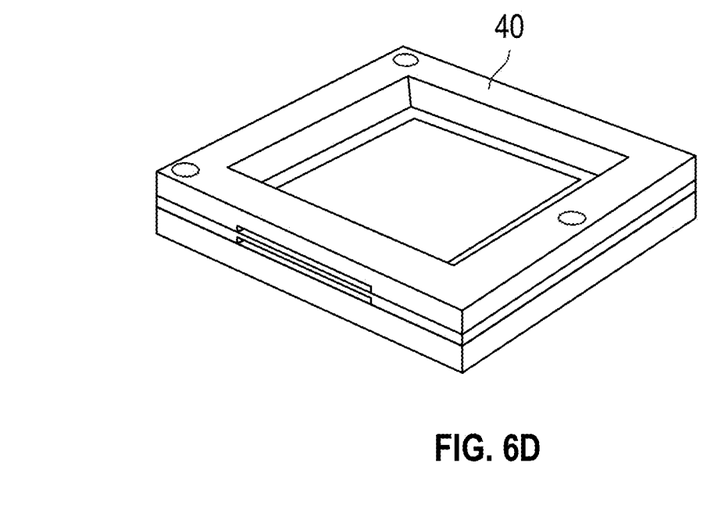

FIG. 6d shows a securing step in which the peripheral edges of the substrate 14 are secured (e.g., clamped between a bottom surface of the top frame 38 and an upper surface of the bottom frame 40) by placing the top frame 40 over the upper surface of the bottom frame 38 (noting that the top and bottom frames 38 and 40 can be clamped to one another magnetically, although other means could be used from clamping them together). In FIG. 6d, the edges of the substrate 14 that extend over the upper surface of the bottom frame 38 will be clamped by the lower surface of the top frame 40, while the central region of the substrate 14 (with the deposited powder layer 24 thereon) laying on the upper surface of the raised portion 10b' of the carrier plate 10', will remain exposed. It is noted that the substrate 14 used in the implementation of FIGS. 6a-6d can be flexible, similar to the substrate 14 discussed above regarding FIGS. 1-3, although it is not necessary for it to be flexible for the securing technique shown in FIGS. 6a-6d.

Figure 7A:
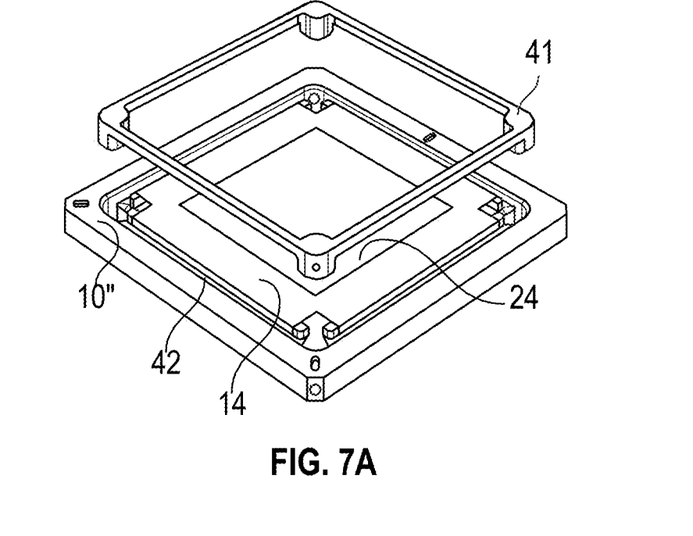
FIGS. 7a-7d show perspective views of steps for assembling another alternative implementation of a carrier plate assembly, in accordance with aspects of the present disclosure.
Figure 7B:
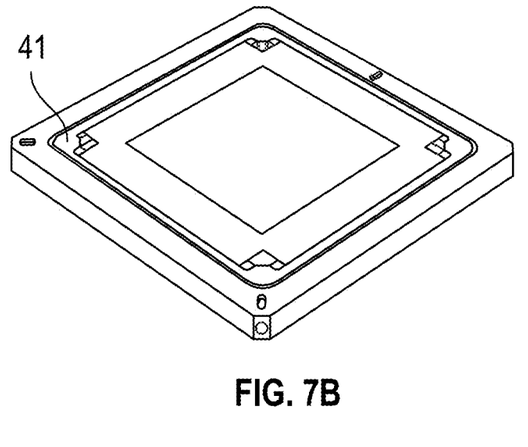
Figure 7C:
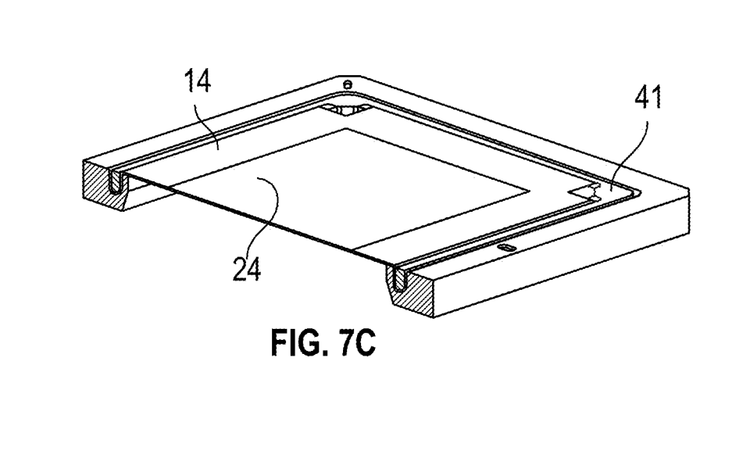
Figure 7D:
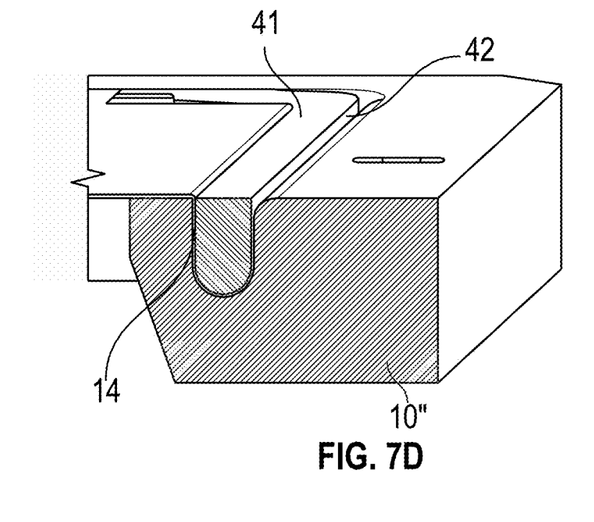

FIGS. 7a-7d show another implementation for a carrier plate 10" for securing edges of a flexible substrate 14. FIG. 7a show adding a top frame 41 to a groove 42 in a carrier plate 10" to hold the substrate 14 (with a deposited layer 24 thereon) in a fixed position. FIG. 7b shows the structure after assembling the top frame 41 in the groove of the carrier plate 10". FIGS. 7c and 7d show cutaway views to show bending the edges of the substrate 14 inside the groove 42 so the substrate 14 can be secured by the top frame 41. The angle of the top frame 41 and the groove 42 can be modified depending on the material properties of the different elements constructing the carrier plate assembly 10" shown in FIGS. 7a-7d, including the materials used for the flexible substrate 14.

It is noted that although the above description has primarily been presented in terms of clamping a substrate with a deposited layer in the environment of additive manufacturing, such as 3D printing, the apparatus and method of this disclosure is not limited to only such structure, and they could be used in any situation where it is desired to secure a substrate with an individual sample mounted thereon, for subsequent processing in a plurality of different stations, followed by ultimate dislodging of the sample from the substrate.

In the following, further features, characteristics and advantages of the instant application will be described by means of items:

Item 1. A carrier plate for clamping a flexible substrate including a lower portion a raised portion located on an upper surface of the lower portion and configured to support the flexible substrate being laid on an upper surface of the raised portion, wherein a first extended region of the lower portion extends on one side of the raised portion and a second extended region of the lower portion extends on an opposite side of the raised portion, a first clamping mechanism formed on an upper surface of the first extended region adjacent to a first side wall of the raised portion, and a second clamping mechanism formed on an upper surface of the second extended region adjacent to a second sidewall of the raised portion, wherein the first and second clamping mechanisms are configured to move from open positions, where the first and second clamping mechanisms are spaced apart from the first and second sidewalls of the raised portion, respectively, to closed positions, where the first and second clamping mechanisms respectively secure opposite edge portions of the flexible substrate between the first and second clamping mechanisms and the first and second sidewalls of the raised portion.

Item 2. The carrier plate of item 1, further comprising first and second magnets located, respectively, on the upper surfaces of the first and second extended portions, and configured to hold the first and second clamping mechanisms, respectively, in the open positions when the first and second clamping mechanisms are not clamping the edge portions of the substrate.

Item 3. The carrier plate of items 1 or 2, further comprising an opening in the carrier plate extending through the lower portion and the raised portion from a lower surface of the lower portion to an upper surface of the raised portion.

Item 4. The carrier plate of any one of items 1-3, further comprising first and second actuators coupled, respectively, to the first and second clamping mechanisms, and configured to move the first and second clamping mechanisms between the open positions and the closed positions.

Item 5. The carrier plate of any one of items 1-4, wherein the carrier plate includes a unique identification code corresponding to an identity of a layer located on the flexible substrate.

Item 6. The carrier plate of any one of items 1-5, further comprising a mechanism configured to open the first clamping mechanism with the first actuator while keeping the second clamping mechanism closed with the second actuator, and to lift the carrier plate to loosen a layer located on the flexible substrate to stack the layer onto a stack of other layers.

Item 7. The carrier plate of any one of items 1-6, wherein the carrier plate further includes a kinematic mount on the lower portion configured to align the carrier plate with stations to which the carrier plate is transported.

Item 8. The carrier plate of any one of items 1-7, wherein the first and second clamping mechanisms comprise elongated bars.

Item 9. The carrier plate of any one of items 1-8, wherein the opening is configured to receive an output from an energy source and apply the output to the flexible substrate through the opening.

Item 10. The carrier plate of any one of items 1-9, wherein the carrier plate includes handles.

Item 11. The carrier plate of any one of items 1-10, wherein the carrier plated further includes locators configured to ensure that the carrier plate may only be positioned in only one specific orientation it moves between processing stations configured to process powder deposited on the substrate on the carrier plate.

Item 12. The carrier plate of any one of items 1-11, wherein the locators include at least one of locator pins or openings in the carrier plate.

Item 13. The carrier plate of any one of items 1-12, wherein the carrier plate further includes an identification device configured to allow information to be read and/or written to it, and/or updated during or between various stages of processing, transport and/or use of powder deposited on the substrate on the carrier plate.

Item 14. The carrier plate of any one of items 1-13, wherein the first and second sidewalls of the raised portion of the carrier plate comprise a smooth or slippery surface.

Item 15. The carrier plate of any one of items 1-14, wherein the first and second clamping mechanisms include a textured surface located to contact the edge portions of the flexible substrate when the first and second clamping mechanisms are in the closed positions.

Item 16. The carrier plate of any one of items 1-15, wherein the first and second clamping mechanisms include a surface with protrusions located to contact the edge portions of the flexible substrate when the first and second clamping mechanisms are in the closed positions.

Item 17. The carrier plate of any one of items 1-16, wherein the opening is configured to receive an output from a differential pressure source and apply the output to the flexible substrate through the opening.

Item 18. The carrier plate of any one of items 1-17, wherein a central axis of each of the first and second clamping mechanisms lower in the closed position of the first and second clamping mechanisms than the central axis of each of the first and second clamping mechanisms in the open position of the first and second clamping mechanisms.

Item 19. A carrier plate assembly including a carrier plate having a lower portion and a raised portion in a central region of the lower portion, wherein the raised portion extends above an upper surface of the lower portion, a bottom frame configured to be located on a peripheral upper surface region of the lower portion to surround sidewalls of the raised portion and to expose an upper surface of the raised portion, the bottom frame being further configured to support peripheral edge regions of a flexible substrate laid on the upper surface of the raised portion of the carrier plate, and a top frame configured to be located on a peripheral upper surface of the bottom frame to clamp the peripheral edge portions of the flexible substrate, the top frame including an opening for exposing an upper surface of the flexible substrate.

Item 20. The carrier plate assembly of item 19, wherein the carrier plate, the bottom frame and the top frame are configured to adhere to one another magnetically.

Item 21. The carrier plate assembly of items 19 or 20, wherein the top frame includes an O-ring on a bottom surface thereof.

Item 22. The carrier plate assembly of any one of items 19-21, wherein sidewalls of the top frame surrounding the opening in the top frame are sloped inward.

Item 23. A carrier plate assembly including a carrier plate having a central opening surrounded by a peripheral region, wherein a groove is formed in the upper surface of the peripheral region to surround the central opening, the groove being spaced from edges of the central opening to form an inner upper surface peripheral region of the carrier plate between sidewalls of the central opening and inner edges, and to form an outer upper peripheral surface region surrounding outer edges of the groove, and a top frame configured to fit into the groove and to secure edges of the substrate which extend into the groove, the substrate being located over the central opening and over the inner upper surface peripheral region, between inner sidewalls of the top frame and inner sidewalls of the groove.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. A carrier plate for clamping a flexible substrate comprising:
   a lower portion;
   a raised portion located on an upper surface of the lower portion and configured to support the flexible substrate being laid on an upper surface of the raised portion;
   wherein a first extended region of the lower portion extends on one side of the raised portion and a second extended region of the lower portion extends on an opposite side of the raised portion;

a first clamping mechanism formed on an upper surface of the first extended region adjacent to a first side wall of the raised portion; and a second clamping mechanism formed on an upper surface of the second extended region adjacent to a second sidewall of the raised portion; and an identification device configured to allow at least two of: information to be read from the identification device, information to be written to the identification device, information on the identification device to be updated during or between various stages of processing, transport, and use of powder deposited on the flexible substrate; and wherein the first and second clamping mechanisms are configured to move from open positions, where the first and second clamping mechanisms are spaced apart from the first and second sidewalls of the raised portion, respectively, to closed positions, where the first and second clamping mechanisms respectively secure opposite edge portions of the flexible substrate between the first and second clamping mechanisms and the first and second sidewalls of the raised portion.

2. The carrier plate of claim 1, further comprising an opening extending from a lower surface of the lower portion through to an upper surface of the raised portion.

3. The carrier plate of claim 2, wherein the opening is configured to receive an output from an energy source and apply the output to the flexible substrate through the opening.

4. The carrier plate of claim 2, wherein the opening is configured to receive an output from a differential pressure source and apply the output to the flexible substrate through the opening.

5. The carrier plate of claim 1, further comprising a unique identification code corresponding to an identity of a layer located on the flexible substrate.

6. The carrier plate of claim 1, further comprising a mechanism configured to open the first clamping mechanism while keeping the second clamping mechanism closed, and to lift the carrier plate to loosen a layer located on the flexible substrate to stack the layer onto a stack of other layers.

7. The carrier plate of claim 1, further comprising a kinematic mount on the lower portion configured to align the carrier plate with stations to which the carrier plate is transported.

8. The carrier plate of claim 1, further comprising handles, each handle positioned at opposite sides of the lower portion.

9. The carrier plate of claim 1, further comprising locators configured to ensure the carrier plate is positioned in one orientation as it moves between processing stations configured to process powder deposited on the flexible substrate.

10. The carrier plate of claim 9, wherein the locators include at least one of locator pins and openings.

11. The carrier plate of claim 1, wherein the first and second sidewalls of the raised portion comprise a smooth or slippery surface.

12. The carrier plate of claim 1, wherein the first and second clamping mechanisms include a textured surface to contact the edge portions of the flexible substrate when the first and second clamping mechanisms are in the closed positions.

13. The carrier plate of claim 1, wherein the first and second clamping mechanisms include a surface with protrusions to contact the edge portions of the flexible substrate when the first and second clamping mechanisms are in the closed positions.

14. The carrier plate of claim 1, wherein a central axis of each of the first and second clamping mechanisms are configured to be lower in the closed position of the first and second clamping mechanisms than the central axis of each of the first and second clamping mechanisms in the open position of the first and second clamping mechanisms.

15. A carrier plate for clamping a flexible substrate comprising:
a lower portion;
a raised portion located on an upper surface of the lower portion and configured to support the flexible substrate being laid on an upper surface of the raised portion;
wherein a first extended region of the lower portion extends on one side of the raised portion and a second extended region of the lower portion extends on an opposite side of the raised portion;
a first clamping mechanism formed on an upper surface of the first extended region adjacent to a first side wall of the raised portion; and
a second clamping mechanism formed on an upper surface of the second extended region adjacent to a second sidewall of the raised portion; and
a first and a second magnet located, respectively, on the upper surfaces of the first and second extended portions, and configured to hold the first and second clamping mechanisms, respectively, in the open positions when the first and second clamping mechanisms are not clamping the edge portions of the flexible substrate; and
wherein the first and second clamping mechanisms are configured to move from open positions, where the first and second clamping mechanisms are spaced apart from the first and second sidewalls of the raised portion, respectively, to closed positions, where the first and second clamping mechanisms respectively secure opposite edge portions of the flexible substrate between the first and second clamping mechanisms and the first and second sidewalls of the raised portion.

16. A carrier plate for clamping a flexible substrate comprising:
a lower portion;
a raised portion located on an upper surface of the lower portion and configured to support the flexible substrate being laid on an upper surface of the raised portion;
wherein a first extended region of the lower portion extends on one side of the raised portion and a second extended region of the lower portion extends on an opposite side of the raised portion;
a first clamping mechanism formed on an upper surface of the first extended region adjacent to a first side wall of the raised portion; and
a second clamping mechanism formed on an upper surface of the second extended region adjacent to a second sidewall of the raised portion; and
a first and a second actuator coupled, respectively, to the first and second clamping mechanisms, and configured to move the first and second clamping mechanisms between the open positions and the closed positions; and
wherein the first and second clamping mechanisms are configured to move from open positions, where the first and second clamping mechanisms are spaced apart from the first and second sidewalls of the raised portion, respectively, to closed positions, where the first and second clamping mechanisms respectively secure opposite edge portions of the flexible substrate between the first and second clamping mechanisms and the first and second sidewalls of the raised portion.

17. A carrier plate for clamping a flexible substrate comprising:
- a lower portion;
- a raised portion located on an upper surface of the lower portion and configured to support the flexible substrate being laid on an upper surface of the raised portion;
- wherein a first extended region of the lower portion extends on one side of the raised portion and a second extended region of the lower portion extends on an opposite side of the raised portion;
- a first clamping mechanism formed on an upper surface of the first extended region adjacent to a first side wall of the raised portion; and
- a second clamping mechanism formed on an upper surface of the second extended region adjacent to a second sidewall of the raised portion; and
- wherein the first and second clamping mechanisms are configured to move from open positions, where the first and second clamping mechanisms are spaced apart from the first and second sidewalls of the raised portion, respectively, to closed positions, where the first and second clamping mechanisms respectively secure opposite edge portions of the flexible substrate between the first and second clamping mechanisms and the first and second sidewalls of the raised portion; and
- wherein the first and second clamping mechanisms comprise elongated bars.

* * * * *